US012401946B2

(12) United States Patent
Jiang

(10) Patent No.: US 12,401,946 B2
(45) Date of Patent: Aug. 26, 2025

(54) AUDIO SIGNAL PROCESSING METHOD, DEVICE AND STORAGE MEDIUM

(71) Applicants: GUANGZHOU SHIYUAN ELECTRONIC TECHNOLOGY COMPANY LIMITED, Guangzhou (CN); GUANGZHOU SHIKUN ELECTRONICS CO., LTD., Guangzhou (CN)

(72) Inventor: Jianliang Jiang, Guangzhou (CN)

(73) Assignees: GUANGZHOU SHIYUAN ELECTRONIC TECHNOLOGY COMPANY LIMITED, Guangzhou (CN); GUANGZHOU SHIKUN ELECTRONICS CO., LTD., Guangzhou (CN)

( * ) Notice: Subject to any disclaimer, the term of this patent is extended or adjusted under 35 U.S.C. 154(b) by 254 days.

(21) Appl. No.: 17/990,047

(22) Filed: Nov. 18, 2022

(65) Prior Publication Data

US 2023/0090810 A1 Mar. 23, 2023

Related U.S. Application Data

(63) Continuation of application No. PCT/CN2022/075838, filed on Feb. 10, 2022.

(30) Foreign Application Priority Data

May 14, 2021 (CN) ........................ 202110528118.1

(51) Int. Cl.

| | |
|---|---|
| ***H04R 3/04*** | (2006.01) |
| ***G10L 19/00*** | (2013.01) |
| ***G10L 21/043*** | (2013.01) |

(52) U.S. Cl.

CPC ................ *H04R 3/04* (2013.01); *G10L 19/00* (2013.01); *G10L 21/043* (2013.01)

(58) Field of Classification Search

None

See application file for complete search history.

(56) References Cited

U.S. PATENT DOCUMENTS 3,009,105 A * 11/1961 Goodall ................ H05B 41/34 324/76.23
6,252,909 B1 * 6/2001 Tzannes ................ G10L 19/008 375/219

(Continued)

FOREIGN PATENT DOCUMENTS

CN 1975860 A 6/2007
CN 102354500 A 2/2012

(Continued)

OTHER PUBLICATIONS

First Office Action issued in related Australian Application No. 2022275169, mailed Jun. 1, 2023, 4 pages.

(Continued)

*Primary Examiner* — Walter F Briney, III

(57) ABSTRACT

An audio signal processing method, device and storage medium, are provided. The method includes performing sub-band filtering on a to-be-processed audio signal to obtain a plurality of sub-band signals, wherein the number of the sub-band signals is determined according to a lowest frequency of a band-pass filter and a cut-off frequency of an audio apparatus, and the sub-band signals comprise sub-band band-pass signals; and obtaining a target audio signal according to each of the sub-band band-pass signals and a processing algorithm of virtual bass enhancement signal.

20 Claims, 7 Drawing Sheets

(56) References Cited

U.S. PATENT DOCUMENTS

| | | | | |
|---|---|---|---|---|
| 7,277,550 | B1 * | 10/2007 | Avendano | H03G 7/007 704/226 |
| 9,319,789 | B1 | 4/2016 | Nielsen | |
| 2007/0129036 | A1 | 6/2007 | Arora | |
| 2010/0086148 | A1 * | 4/2010 | Hung | H03G 5/165 381/98 |
| 2012/0259626 | A1 | 10/2012 | Li et al. | |
| 2015/0312676 | A1 | 10/2015 | Ekstrand | |
| 2017/0127181 | A1 | 5/2017 | You | |
| 2020/0077189 | A1 | 3/2020 | Grimm et al. | |

FOREIGN PATENT DOCUMENTS

| | | | |
|---|---|---|---|
| CN | 103517183 | A | 1/2014 |
| CN | 104936088 | A | 9/2015 |
| CN | 111970624 | A | 11/2020 |
| CN | 111970627 | A | 11/2020 |

OTHER PUBLICATIONS

Second Office Action issued in related Australian Application No. 2022275169, mailed Oct. 16, 2023, 6 pages.

Third Office Action issued in related Australian Application No. 2022275169, mailed Feb. 7, 2024, 5 pages.

International Search Report issued in corresponding international application No. PCT/CN2022/075838, dated Apr. 29, 2022, 5 pages.

Notice of Reasons for Refusal issued in corresponding Japanese Application No. 2022-573367, mailed Jan. 29, 2024, 10 pages.

Request for the Submission of an Opinion issued in corresponding Korean Application No. 10-2022-7041933, mailed May 13, 2024, 15 pages.

Supplementary European Search Report issued in corresponding European U.S. Appl. No. 22/806,229, mailed Oct. 23, 2023, 1 pages.

* cited by examiner

AUDIO SIGNAL PROCESSING METHOD, DEVICE AND STORAGE MEDIUM

CROSS-REFERENCE TO RELATED APPLICATION

The present disclosure is a continuation of International Application No. PCT/CN2022/075838, filed on Feb. 10, 2022, which claims the benefit of priority to Chinese Patent Application No. 202110528118.1, filed on May 14, 2021. The entire contents of the above-identified applications are expressly incorporated herein by reference.

TECHNICAL FIELD

The present disclosure relates to the field of signal processing technologies, and more particularly, to an audio signal processing method, device and storage medium.

BACKGROUND

With the miniaturization and convenience of multimedia apparatus, the selection of a loudspeaker becomes smaller and smaller. A small loudspeaker, due to the limitation of its physical structure, cannot play back the low frequency components of an audio signal effectively, and the bass playback of the audio signal directly affects the perception, such as the sound fullness and heaviness. Therefore, an improvement to the bass playback effect of the small loudspeaker has been a hot research topic.

For improvement to the bass playback effect of the small loudspeaker, the "pitch missing" principle in psychoacoustics can be used for virtual bass enhancement of the audio signal, for example, a Non-Linear Device (NLD) algorithm is used for non-linear processing on the low-frequency components of the audio signal to generate a harmonic wave. However, the non-linear device algorithm will introduce intermodulation distortion to the audio signal having abundant harmonic components, thereby causing perceived timbre distortion.

SUMMARY

An embodiment of the present disclosure provides an audio signal processing method, device and storage medium to reduce the perceived timbre distortion caused by the non-linear device algorithm and improve the playback effect of a virtual bass. The technical solution is as follows:

In a first aspect, an embodiment of the present disclosure provides an audio signal processing method, including: performing sub-band filtering on a to-be-processed audio signal to obtain a plurality of sub-band signals, wherein the number of the sub-band signals is determined according to a lowest frequency of a band-pass filter and a cut-off frequency of an audio apparatus, and the sub-band signals include sub-band band-pass signals; and obtaining a target audio signal according to each of the sub-band band-pass signals and a processing algorithm of virtual bass enhancement signal.

In some implementations, the processing algorithm of virtual bass enhancement signal includes a non-linear device algorithm. Obtaining the target audio signal according to each of the sub-band band-pass signals and the processing algorithm of virtual bass enhancement signal includes: obtaining a virtual bass enhancement signal according to each of the sub-band band-pass signals and the non-linear device algorithm; performing high-pass filtering or delay processing on sub-band high-pass signals in the sub-band signals to obtain a high-frequency audio signal; and obtaining the target audio signal according to the virtual bass enhancement signal and the high-frequency audio signal.

In some implementations, obtaining the virtual bass enhancement signal according to each of the sub-band band-pass signals and the non-linear device algorithm includes: performing non-linear processing on each of the sub-band band-pass signals based on the non-linear device algorithm to obtain a corresponding non-linear signal; performing summation processing on each non-linear signal; performing band-pass filtering on the summed signal to obtain harmonic components of a low-frequency audio signal; and performing audio synthesis of the harmonic components and harmonic components of a to-be-processed audio signal in a previous frame to obtain the virtual bass enhancement signal.

In some implementations, performing summation processing on each non-linear signal includes performing summation processing on each non-linear signal based on a weight corresponding to each non-linear signal, wherein the weight is used to adjust the proportion of the corresponding non-linear signal.

In some implementations, performing high-pass filtering or delay processing on the sub-band high-pass signals in the sub-band signals to obtain the high-frequency audio signal includes performing high-pass filtering or delay processing on the sub-band high-pass signals in the sub-band signals; and overlapping and adding signals obtained through high-pass filtering or delay processing to obtain the high-frequency audio signal.

In some implementations, obtaining the target audio signal according to the virtual bass enhancement signal and the high-frequency audio signal includes: acquiring a preset bass gain; determining a maximum virtual bass gain of the virtual bass enhancement signal according to the high-frequency audio signal and the virtual bass enhancement signal; determining a target virtual bass gain of the virtual bass enhancement signal according to the preset virtual bass gain and the maximum virtual bass gain; performing gain processing on the virtual bass enhancement signal based on the target virtual bass gain to obtain a bass harmonic signal; and superimposing the bass harmonic signal and the high-frequency audio signal to obtain the target audio signal.

In some implementations, before performing sub-band filtering on the to-be-processed audio signal to obtain the plurality of sub-band signals, the method further includes: performing continuous frame fetching processing or overlapping frame fetching processing on an input source audio signal to obtain the to-be-processed audio signal, wherein a frame length of the to-be-processed audio signal is determined according to at least one of a sampling rate, a processing resource, and a system delay.

In some implementations, after obtaining the target audio signal according to each of the sub-band band-pass signals and the processing algorithm of virtual bass enhancement signal, the method further includes performing audio dynamic range control on the target audio signal to obtain a to-be-output audio signal.

In a second aspect, an embodiment of the present disclosure provides an audio signal processing device, including: a sub-band filtering module, configured to perform sub-band filtering on a to-be-processed audio signal to obtain a plurality of sub-band signals, wherein the number of the sub-band signals is determined according to a lowest frequency of a band-pass filter and a cut-off frequency of an audio apparatus, and the sub-band signals include sub-band band-pass signals; and a processing module, configured to obtain a target audio signal according to each of the sub-band band-pass signals and a processing algorithm of virtual bass enhancement signal.

In some implementations, the processing algorithm of virtual bass enhancement signal includes a non-linear device algorithm. The processing module may include: a virtual bass enhancement unit, configured to obtain a virtual bass enhancement signal according to each of the sub-band band-pass signals and the non-linear device algorithm; a high-pass filtering unit, configured to perform high-pass filtering or delay processing on sub-band high-pass signals in the sub-band signals to obtain a high-frequency audio signal; a synthesis unit, configured to obtain the target audio signal according to the virtual bass enhancement signal and the high-frequency audio signal.

In some implementations, the virtual bass enhancement unit is configured to: perform non-linear processing on each of the sub-band band-pass signals based on the non-linear device algorithm to obtain a corresponding non-linear signal; perform summation processing on each non-linear signal; perform band-pass filtering on the summed signal to obtain harmonic components of a low-frequency audio signal; and perform audio synthesis of the harmonic components and harmonic components of a to-be-processed audio signal in a previous frame to obtain the virtual bass enhancement signal.

In some implementations, when performing summation processing on each non-linear signal includes, the virtual bass enhancement unit is configured to: perform summation processing on each non-linear signal based on a weight corresponding to each non-linear signal, wherein the weight is used to adjust the proportion of the corresponding non-linear signal.

In some implementations, the high-pass filtering unit is configured to: perform high-pass filtering or delay processing on the sub-band high-pass signals in the sub-band signals; and overlap and add signals obtained through high-pass filtering or delay processing to obtain the high-frequency audio signal.

In some implementations, the synthesis unit is configured to: acquire a preset bass gain; determine a maximum virtual bass gain of the virtual bass enhancement signal according to the high-frequency audio signal and the virtual bass enhancement signal; determine a target virtual bass gain of the virtual bass enhancement signal according to the preset virtual bass gain and the maximum virtual bass gain; perform gain processing on the virtual bass enhancement signal based on the target virtual bass gain to obtain a bass harmonic signal; and superimpose the bass harmonic signal and the high-frequency audio signal to obtain the target audio signal.

In some implementations, the audio signal processing device further includes: a frame fetching processing module, configured to perform continuous frame fetching processing or overlapping frame fetching processing on an input source audio signal to obtain the to-be-processed audio signal, wherein a frame length of the to-be-processed audio signal is determined according to at least one of a sampling rate, a processing resource, and a system delay.

In some implementations, the audio signal processing device further includes: a control module, configured to perform audio dynamic range control on the target audio signal to obtain a to-be-output audio signal.

In a third aspect, an embodiment of the present disclosure provides a computer storage medium, wherein the computer storage medium stores a plurality of instructions, the instructions are adapted to be loaded by a processor and execute the above method steps.

In a fourth aspect, an embodiment of the present disclosure provides an electronica apparatus, including a processor and a memory, wherein the memory stores a computer program, the computer program is adapted to be loaded by the processor and execute the above method steps.

In a fifth aspect, an embodiment of the present disclosure provides a computer program product, including a computer program, wherein the computer program is adapted to be loaded by a processor and execute the above method steps.

In the embodiment of the present disclosure, sub-band filtering is performed on a to-be-processed audio signal to obtain a plurality of sub-band signals, wherein the number of the sub-band signals is determined according to a lowest frequency of a band-pass filter and a cut-off frequency of an audio apparatus, and the sub-band signals include sub-band band-pass signals. And a target audio signal is obtained according to each of the sub-band band-pass signals and a processing algorithm of virtual bass enhancement signal. By performing the sub-band filtering on the to-be-processed audio signal, and performing virtual bass enhancement signal processing on each of the sub-band band-pass signals using the processing algorithm of virtual bass enhancement signal, intermodulation distortion is restricted by the sub-band band-pass signals, thereby reducing perceivable timbre distortion, and improving the playback effect of a virtual bass.

BRIEF DESCRIPTION OF THE DRAWINGS

In order to describe the technical solution in the embodiments of the present disclosure or the related art more clearly, the accompanying drawings required in the description of the embodiments or the related art will be briefly introduced below. The accompanying drawings in the description below are merely some embodiments of the present disclosure, and for those of ordinary skill in the art, other drawings may be obtained from these drawings without creative efforts.

DETAILED DESCRIPTION

Figure 1:
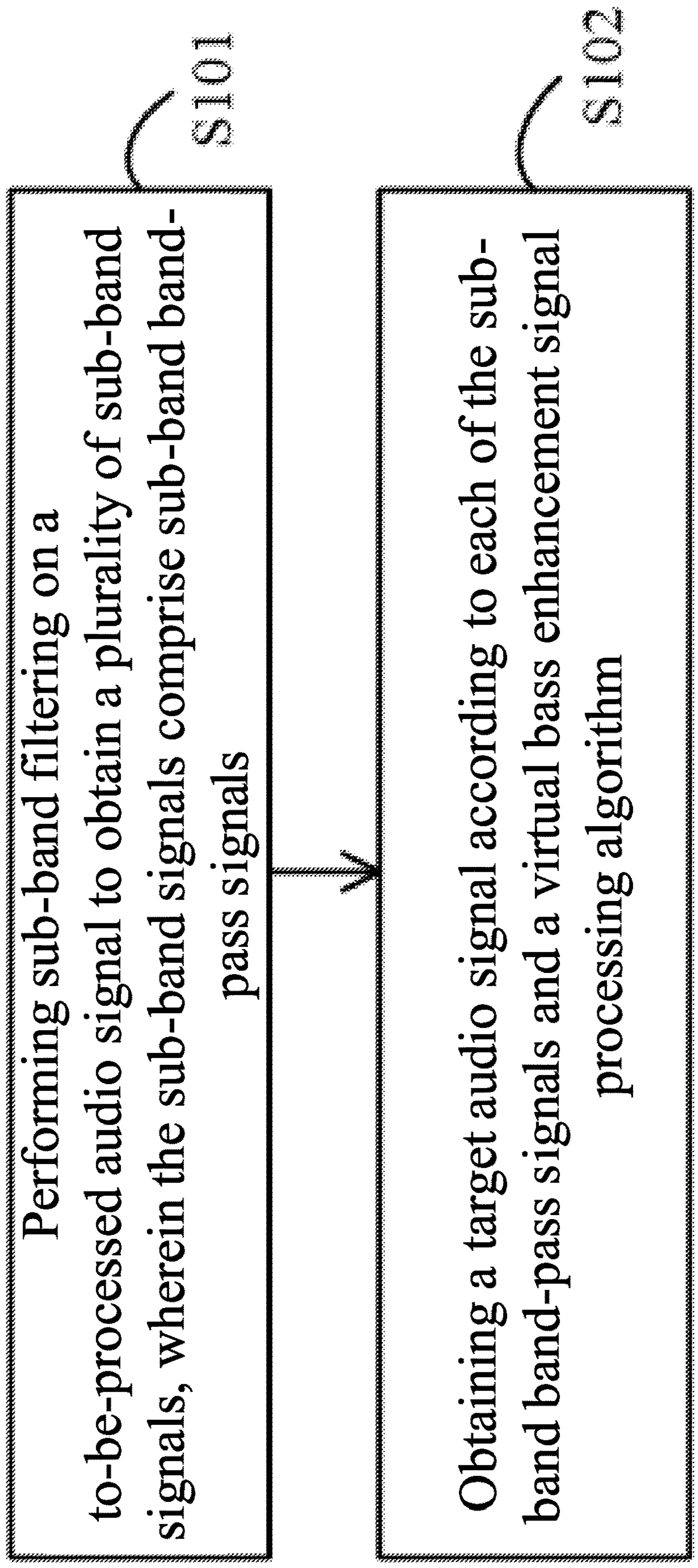
FIG. 1 is a schematic diagram of flows of an audio signal processing method according to an embodiment of the present disclosure.

In order to make the purposes, technical solutions, and advantages of the present disclosure clearer, embodiments of the present disclosure are described in further detail below with reference to the accompanying drawings.

It should be clear that the described embodiments are only a part rather than all of the embodiments of the present disclosure. Based on the embodiments of the present disclosure, all other embodiments obtained by those of ordinary skill in the art without creative effort shall fall within the scope of protection of the present disclosure.

When the following description relates to the accompanying drawings, the same numerals in different drawings denote the same or similar elements unless otherwise indicated. The embodiments described in the following exemplary embodiments do not represent all embodiments consistent with the present disclosure. Instead, they are merely examples of devices and methods consistent with some aspects of the present disclosure as detailed in the appended claims.

In the description of the present disclosure, it is to be understood that the terms "first," "second," "third," and the like are only used to distinguish similar objects, but are not necessarily used to describe a specific order or sequence, and can't be understood as indicating or implying relative importance. For those of ordinary skill in the art, the specific meaning of the above terms in the present disclosure may be understood as the case may be. In addition, in the description of the present disclosure, unless otherwise specified, "a plurality of" means two or more. "And/or" describes an association relationship of associated objects, and indicates that three relationships may exist, for example, A and/or B may indicate three cases: A exists alone, A and B exist simultaneously, and B exists alone. The character "/" generally indicates that the associated objects are of an "or" relationship.

At present, there are two main ways to improve the bass playback effect of a loudspeaker. One way is to use an equalizer (adjust EQ) to directly increase the low-frequency gain, which may improve the bass playback effect to a certain extent, but may hardly control the gain amplitude, may easily cause irreversible damage to the loudspeaker, and will reduce the service life of the loudspeaker. The other is to perform virtual bass enhancement processing on the audio signal by using the "pitch missing" principle in psychoacoustics, which can effectively improve, by playing back the harmonic components of the synthesized bass fundamental frequency, the bass perception of the listener while ensuring the normal operation of the small loudspeaker.

Wherein the virtual bass enhancement method can be divided into two types: the first type is to convert, by using time-frequency conversion technology, a time-domain signal to frequency domain, generate a harmonic wave corresponding to the fundamental frequency in the frequency domain, and then convert it to time domain; the second type is to use the Non-Linear Device (NLD) algorithm to perform non-linear processing on the low-frequency signal to generate a harmonic wave. These two types of methods have their own advantages and disadvantages. The first type of method can precisely control the components and amplitudes of a harmonic wave, but has a poor transient effect and cannot meet requirements in an audio processing occasion with a high real-time requirement. However, the NLD has a simple structure and good real-time performance, but also introduces intermodulation distortion to an audio signal having abundant harmonic components, which easily causes a perceived timbre change.

Based on the above problems, an embodiment of the present disclosure provides an audio signal processing method, device, and storage medium. By dividing a to-be-processed audio signal into a plurality of sub-band signals, and performing non-linear processing on each of sub-band signals using a non-linear device algorithm, intermodulation distortion is restricted by the sub-band signals, and the intermodulation distortion caused by the non-linear device algorithm is reduced, thereby reducing perceivable timbre distortion, and improving the playback effect of a virtual bass.

It should be noted that, due to space limitation, the specification of the present disclosure does not enumerate all optional implementations, and it should be conceivable to those skilled in the art, after reading the specification of the present disclosure, that any combination of technical features may constitute an optional embodiment as long as the technical features are not contradictory to each other.

For example, one technical feature a is described in one implementation of Embodiment 1, and another technical feature b is described in another implementation of the Embodiment 1. Since the above two technical features do not contradict each other, it should be conceivable to those skilled in the art, after reading the specification of the present disclosure, that an implementation having these two features is also an optional implementation, i.e., a and b.

The technical features described in different embodiments that do not contradict each other can also be combined in any way to constitute an optional implementation.

For example, a technical feature c is described in the Embodiment 1. In order to control the space of the specification of the present disclosure, this technical feature is not described in Embodiments 2 and 3. However, it should be conceivable to those skilled in the art, after reading the specification of the present disclosure, that the audio signal processing method according to Embodiments 2 and 3 may also include the technical feature.

Embodiments 1, 2, and 3 will be described in detail below.

Embodiment 1

An embodiment of the present disclosure discloses an audio signal processing method, which is applied to an electronic apparatus having an audio speaker function such as a small loudspeaker, or an electronic apparatus including a small loudspeaker. The audio signal processing method according to an embodiment of the present disclosure will be introduced in detail below with reference to FIG. 1.

Referring to FIG. 1, a flowchart of an audio signal processing method disclosed in the embodiment of the present disclosure is shown. The method includes the following steps:

S101, performing sub-band filtering on a to-be-processed audio signal to obtain a plurality of sub-band signals, wherein the sub-band signals include sub-band band-pass signals.

Wherein the number of the sub-band signals is determined according to a lowest frequency of a band-pass filter and a cut-off frequency of an audio apparatus. The greater the number of the sub-band signals, the smaller the intermodulation distortion caused by virtual bass enhancement signal processing (for example, non-linear processing).

Exemplarily, a sub-band filter bank is provided in the electronic apparatus, and the sub-band filter bank consists of a high-pass filter and a series of band-pass filters. Wherein the cut-off frequency of the high-pass filter may be directly set to a cut-off frequency $f_0$ of an audio apparatus (e.g., a loudspeaker) in the electronic apparatus, and the cut-off frequency of the band-pass filter is also set according to $f_0$.

The number of sub-band signals may be set according to $N=\mathrm{ceil}(f_0/f_{low})-1$, wherein ceil( ) means rounding up the numerical value; $f_{low}$ is a set lowest frequency of the band-pass filter, and may be set to, for example, a lower limit of 20 Hz of human ear's audible frequency.

In some implementations, according to a descending order of cutoff frequencies of band-pass filters, an upper cut-off frequency and a lower cut-off frequency of a band-pass filter corresponding to a first sub-band signal $X_{b1}(n)$ are respectively $f_{h1}=f_0$ and $f_{l1}=f_0/2$, an upper cut-off frequency and a lower cut-off frequency of a band-pass filter corresponding to a second sub-band signal $X_{b2}(n)$ are respectively $f_{h2}=f_0/2$ and $f_{l2}=f_0/3$, . . . , an upper cut-off frequency and a lower cut-off frequency of a band-pass filter corresponding to a i-th sub-band signal $X_{b1}(n)$ are respectively $f_{hn}=f_0/n$ and $f_{ln}=f_0/(n+1)$, . . . , an upper cut-off frequency and a lower cut-off frequency of a band-pass filter corresponding to a N-th sub-band signal $X_{bN}(n)$ are respectively $f_{hN}=f_0/N$ and $flN=f_0/(N+1)$. If $f_0/(N+1)<f_{low}$, $f_{lN}=f_{low}$. The implementation of the band-pass filter is not limited here.

The electronic apparatus performs sub-band filtering on a to-be-processed audio signal $X_{in(n)}$ through the sub-band filter bank, so as to obtain a series of sub-band signals including a sub-band band-pass signal $X_{b1}(n)$ and a sub-band high-pass signal $x_{H1}(n)$, wherein i is a positive integer less than or equal to N.

S102, obtaining a target audio signal according to each of the sub-band band-pass signals and a processing algorithm of virtual bass enhancement signal.

In this step, the virtual bass signal processing algorithm is used to perform virtual bass signal processing on each of the sub-band band-pass signals, so as to reduce the influence of intermodulation between the sub-band band-pass signals, that is, the intermodulation distortion is restricted by the sub-band band-pass signals.

In the embodiment of the present disclosure, sub-band filtering is performed on the to-be-processed audio signal to obtain a sub-band signal including a plurality of sub-band band-pass signals, and the target audio signal is obtained according to each of the sub-band band-pass signals and the processing algorithm of virtual bass enhancement signal. By performing the sub-band filtering on the to-be-processed audio signal, and performing virtual bass enhancement signal processing on each of the sub-band band-pass signals using the processing algorithm of virtual bass enhancement signal, intermodulation distortion is restricted by the sub-band signals, thereby reducing perceivable timbre distortion, and improving the playback effect of a virtual bass.

Embodiment 2

Figure 2:
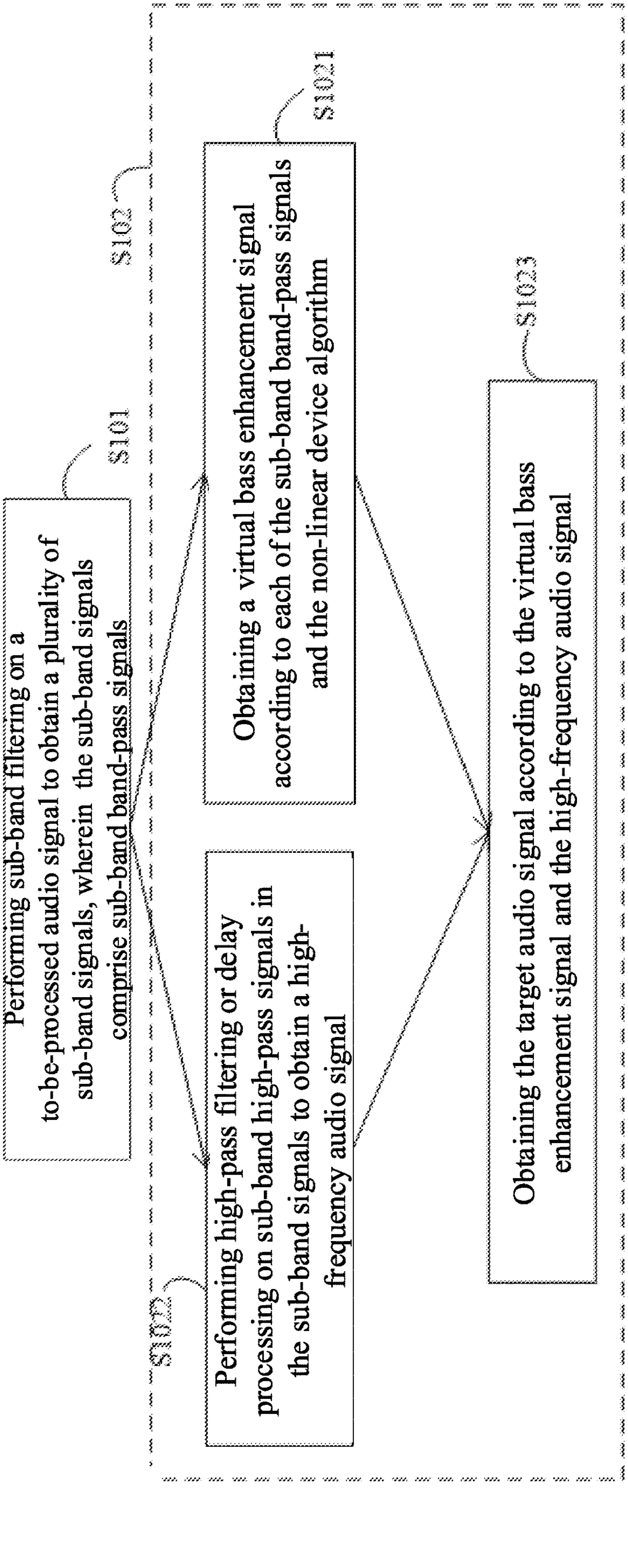
FIG. 2 is a schematic diagram of flows of an audio signal processing method according to another embodiment of the present disclosure.

In the embodiment of the present disclosure, the processing algorithm of virtual bass enhancement signal may be an NLD algorithm, which is also referred to as a non-linear function or a non-linear operation. In this case, as shown in FIG. 2, S102 step may further include:

S1021, obtaining a virtual bass enhancement signal according to each of the sub-band band-pass signals and the non-linear device algorithm.

Figure 3:
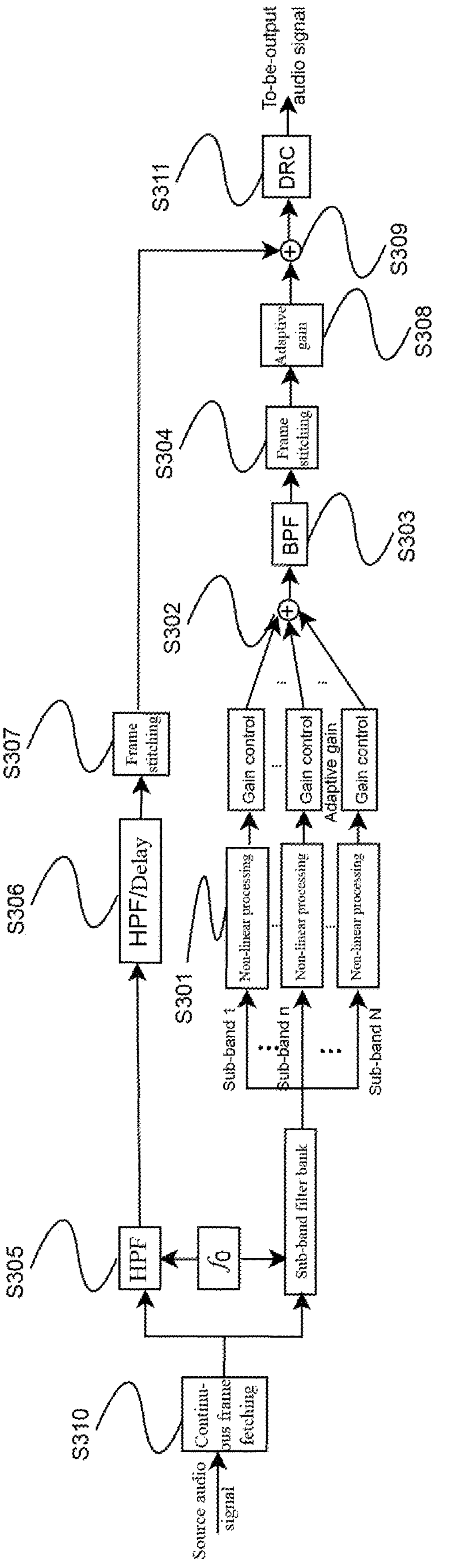
FIG. 3 is a schematic diagram of flows of an audio signal processing method according to yet another embodiment of the present disclosure.

In an exemplary embodiment, referring to FIG. 3, the step may include:

S301, performing non-linear processing on each of the sub-band band-pass signals based on the non-linear device algorithm to obtain a corresponding non-linear signal.

Exemplarily, non-linear processing is performed on the sub-band band-pass signal $X_{bi}(n)$ to generate a non-linear signal $X_{nldi}(n)$. For example, non-linear processing is performed on the sub-band band-pass signal $X_{bi}(n)$ by the following formula:

$$X_{nldi}(n)=(e-e^{1-X_{bi}(n)})/(e-1)$$

S302, performing summation processing on each non-linear signal.

Further, performing summation processing on each non-linear signal may include performing summation processing on each non-linear signal based on a weight corresponding to each non-linear signal. Wherein the weight is used to adjust the proportion of the corresponding non-linear signal.

Exemplarily, $X_{nldi}(n)$ obtained in S301 are summed according to corresponding weights to obtain a sum signal $X_{nld}(n)$, i.e., $$X_{nld}(n)=\sum_{i=1}^{N}\alpha_i X_{nld_i}(n),$$

wherein $\alpha_i$ in the formula is the weight corresponding to a i-th non-linear signal.

S303, performing band-pass filtering on the summed signal to obtain harmonic components of a low-frequency audio signal.

Exemplarily, band-pass filtering is performed on the sum signal $X_{nld}(n)$ obtained in S302 to obtain the harmonic component $H_{nld}(n)$ of the low-frequency audio signal. Wherein the cut-off frequency of the Band-Pass Filter (BPF) used in this step is determined by the cut-off frequency $f_0$ of an audio apparatus (such as a loudspeaker) in the electronic apparatus, which generally is taken from $[f_0, 6f_0]$. In some implementations, the band-pass filter is a non-recursive filter, also referred to as a Finite Impulse Response (FIR) filter, but is not limited in the present disclosure.

Through band-pass filtering in this step, high-order harmonic components required by the summed low-frequency signal to generate the virtual bass signal can be removed.

S304, performing audio synthesis (frame stitching) of the harmonic components and harmonic components of a to-be-processed audio signal in a previous frame to obtain the virtual bass enhancement signal.

Exemplarily, audio synthesis is performed on $H_{nld}(n)$ obtained in S303 and the harmonic component $H'_{nld}(n)$ of a to-be-processed audio signal in a previous frame through overlapping and adding to obtain a synthesized virtual bass enhancement signal.

S1022, performing high-pass filtering or delay processing on sub-band high-pass signals in the sub-band signals to obtain a high-frequency audio signal.

In some implementations, the electronic apparatus may execute S1021 and S1022 in parallel.

In an exemplary embodiment, as shown in FIG. 3, the step may include:

S305, performing sub-band high-pass filtering on the to-be-processed audio signal to obtain sub-band high-pass signals.

Exemplarily, the electronic apparatus may filter out a high-frequency signal $x_{H1}(n)$ through high-pass filtering. In some implementations, the order of the high-pass filter coincides with the order of the sub-band band-pass filter in step S101.

S306, performing high-pass filtering or delay processing on the sub-band high-pass signal.

Exemplarily, this step performs second high-pass filtering or delay processing on a sub-band high-pass signal $x_{H1}(n)$ filtered out in S305 to obtain a high-pass filtered signal $x_{H2}(n)$.

In some implementations, if a High-Pass Filter (HPF) is used to implement high-pass filtering, the order of the high-pass filter coincides with the order of the band-pass filter in step S303; or if the delay processing is used, the delay coincides with delay caused by signal processing in step S303.

S307, overlapping and adding (frame stitching) signals obtained by high-pass filtering or delay processing to obtain a high-frequency audio signal.

For example, the signals obtained in the step S306 is overlapped and added by the overlap-add method to obtain a high-frequency audio signal $x_H(n)$.

It should be noted that the embodiment of the present disclosure does not limit the execution order of S305 to S307 and S301 to S304. It can be understood that the electronic apparatus may first execute S301 to S307 in sequence, or the electronic apparatus may first execute S305 to S307 and then execute S301 to S304, or the electronic apparatus executes S301 to S304 in parallel with S305 to S307, which may be set accordingly according to the calculation force of the electronic apparatus.

S1023, obtaining the target audio signal according to the virtual bass enhancement signal and the high-frequency audio signal.

In an exemplary embodiment, a gain-based bass harmonic signal $X_{vir}(n)$ is generated using an adaptive gain method according to the virtual bass enhancement signal H(n), the high-frequency audio signal $x_H(n)$, and a preset virtual bass gain $G_u$. Therefore, it may further include obtaining a target virtual bass gain.

Exemplarily, obtaining the target virtual bass gain may further include:

1. Obtaining a preset virtual bass gain.

That is, the preset virtual bass gain $G_u$, is acquired.

2. Determining a maximum virtual bass gain of the virtual bass enhancement signal according to the high-frequency audio signal and the virtual bass enhancement signal.

A maximum normalized gain of the target audio signal is set to $G_{limit}$, and $G_{limit}$ can be set to 0 dBFS at most.

Exemplarily, a maximum virtual bass gain $G_m(n)$ of the virtual bass enhancement signal according to the high-frequency audio signal $x_H(n)$ and the virtual bass enhancement signal H(n):

$$G_m(n) = 20\log 10\left(\frac{diff}{|H(n)| + eps}\right)$$

In the formula, $$diff = \begin{cases} eps & 10^{\frac{G_{limit}}{20}} \le |x_H(n)| \\ 10^{\frac{G_{limit}}{20}} - |x_H(n)| & 10^{\frac{G_{limit}}{20}} > |x_H(n)| \end{cases},$$

and eps is the upper limit of relative error of the processor.

3. Determining the target virtual bass gain of the virtual bass enhancement signal according to the preset virtual bass gain and the maximum virtual bass gain.

Exemplarily, a target virtual bass gain $G_p(n)$ is obtained according to the preset virtual bass gain $G_u$ and the maximum virtual bass gain $G_m(n)$ calculated in real time, and the implementation algorithm is:

$$G_p(n) = \begin{cases} \alpha_A Gp(n-1) + (1-\alpha_A) * G & G > Gp(n-1) \\ \alpha_R Gp(n-1) + (1-\alpha_R) * G & G \le Gp(n-1) \end{cases}$$

$$\text{wherein } G = \begin{cases} G_m(n) & G_u(n) > G_m(n) \\ G_u(n) & G_u(n) \le G_m(n) \end{cases}$$

S308, performing gain processing (i.e., adaptive gain) on the virtual bass enhancement signal based on the target virtual bass gain to obtain a bass harmonic signal.

For example, a bass harmonic signal $X_{vir}(n)$ is obtained by the following formula:

$$X_{vir}(n)=H(n)*10\hat{}(G_p(n)/20).$$

S309, superimposing the bass harmonic signal and the high-frequency audio signal to obtain the target audio signal.

Exemplarily, $X_{vir}(n)$ obtained in S308 and $x_H(n)$ obtained in S307 are superimposed to obtain a target audio signal $y_1(n)$.

Embodiment 3

In the embodiment of the present disclosure, as shown in FIG. 3, before performing sub-band filtering on the to-be-processed audio signal to obtain the plurality of sub-band signals, the audio signal processing method may further include:

S310, performing continuous frame fetching processing on an input source audio signal to obtain the to-be-processed audio signal.

In some implementations, overlapping frame fetching processing is performed on the input source audio signal to obtain the to-be-processed audio signal. In some implementations, in order to output a smooth to-be-processed audio signal, the source audio signal may be windowed using a hanging window.

Wherein the frame length of the to-be-processed audio signal is determined according to at least one of a sampling rate, a processing resource (for calculation), and a system delay. It should be understood that for the same time length, the larger the sampling rate, the longer the frame length of the to-be-processed audio signal; for the same time length, the more processing resources (for calculation), the longer the frame length of the to-be-processed audio signal that the electronic apparatus can process; the smaller the system delay, the longer the frame length of the to-be-processed audio signal that the electronic apparatus can process.

The embodiment of the present disclosure obtains the to-be-processed audio signal by performing continuous frame fetching processing or overlapping frame fetching processing on the input source audio signal, to achieve real-time processing on the source audio signal. Through real-time virtual bass enhancement processing, the perceived timbre distortion caused by non-linear processing is reduced, and the playback effect of virtual bass is improved.

Embodiment 4

On the basis of the above embodiment, as shown in FIG. 3, after obtaining the target audio signal, the embodiment of the present disclosure may further include:

S311, performing audio Dynamic Range Control (DRC) on the target audio signal to obtain a to-be-output audio signal.

Exemplarily, audio dynamic range control is performed on the target audio signal $y_1(n)$ obtained in any of the above embodiments to obtain the to-be-output audio signal, i.e., a final virtual bass enhancement signal frame $y_{out}(n)$, and an audio stream is returned.

In summary, the embodiment of the present disclosure has at least the following advantages:

i), the complexity of virtual bass enhancement is reduced, and virtual bass enhancement processing can be performed on the input source audio signal in real time.

ii), the gain of a virtual bass component can be effectively controlled to reduce the intermodulation distortion of the audio signal. Especially for the multi-channel sound playback scenario, a traditional virtual bass enhancement algorithm is easy to cause the blur of a sound image, but the present disclosure solves this problem.

It should be noted that, due to the space limitation, the present disclosure does not enumerate all optional implementations, but as long as features are not contradictory to each other, they can be freely combined and become an optional implementation of the present disclosure.

Embodiment 5

Figure 4:
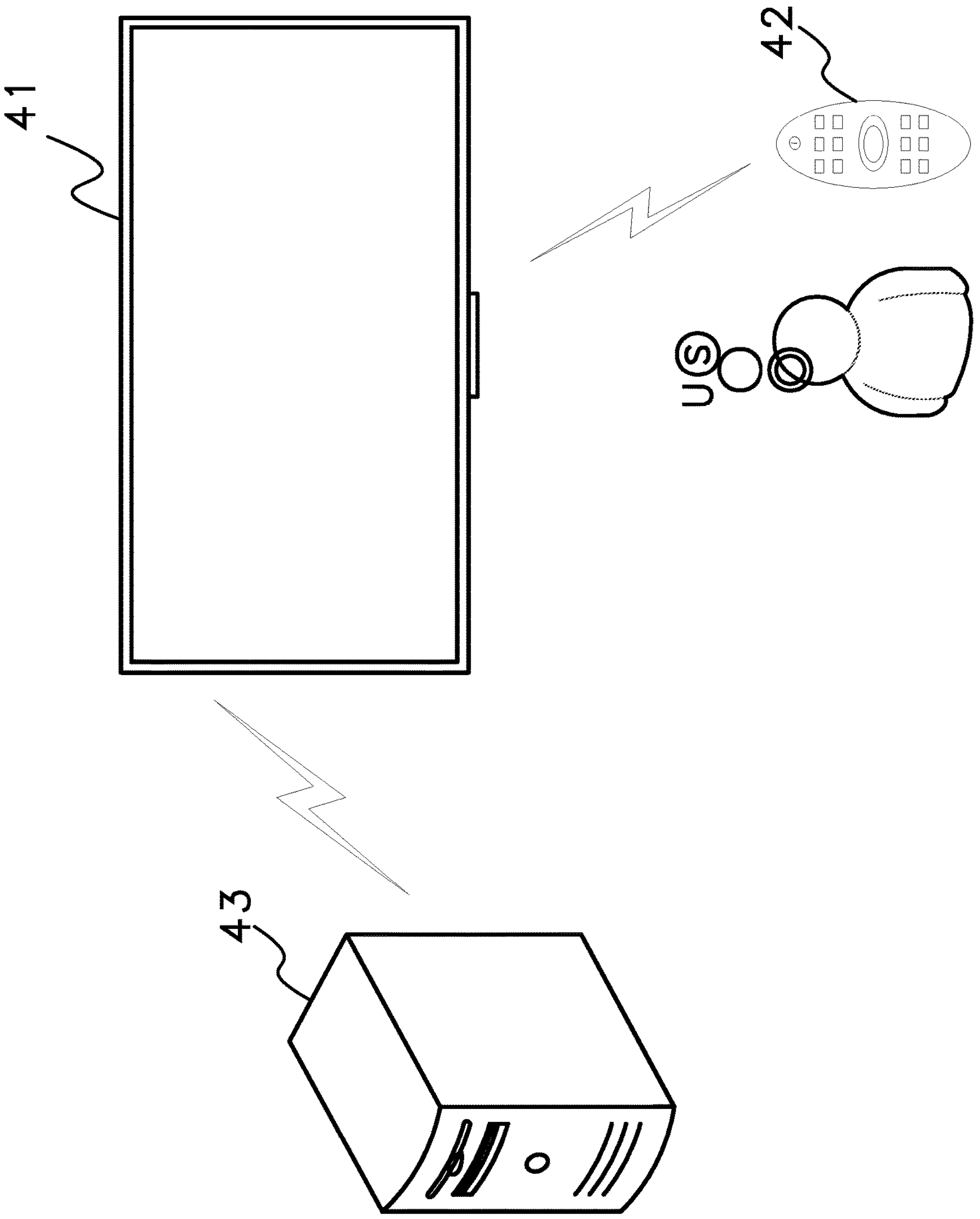
FIG. 4 is a schematic diagram of an application scenario according to an embodiment of the present disclosure.

Referring to FIG. 4, an interactive white board 41 has an audio speaker function, and a user controls the interactive white board 41 through a remote controller 42, and the interactive white board 41 is connected to a server 43. In some implementations, the interactive white board 41 communicates with the server 43 through a Local Area Network (LAN), a Wireless Local Area Network (WLAN), and other networks. The server 43 may provide various content and interactions to the interactive white board 41. The server 43 may be a cluster or a plurality of clusters, and may include one or more types of servers.

This example will be described by taking an electronic apparatus as an interactive white board and a control apparatus as a remote controller as an example, but the present disclosure is not limited thereto. And the present disclosure does not limit the number of interactive white boards and remote controllers, for example, controlling two interactive white boards with one remote controller, or controlling one interactive white board with two remote controllers, or the like.

The user inputs an audio/video playing operation on the remote controller 42, and controls the interactive white board 41 to play the audio/video through the remote controller 42. Then, in response to a control instruction from the remote controller 42, the interactive white board 41 interacts with the server 43 to acquire an audio/video signal (including an audio signal and/or a video signal) to be played, and displays the video signal through a display, and plays the audio signal through an audio apparatus. Wherein the audio apparatus performs, on the acquired audio signal, processing as described in the above audio signal processing method to achieve the effect of enhancing the virtual bass of the audio signal, and plays the obtained target audio signal.

Embodiment 6

The following is a device embodiment of the present disclosure, and can be used to execute a method embodiment of the present disclosure. For details not disclosed in the device embodiment of the present disclosure, reference is made to the method embodiment of the present disclosure.

Figure 5:
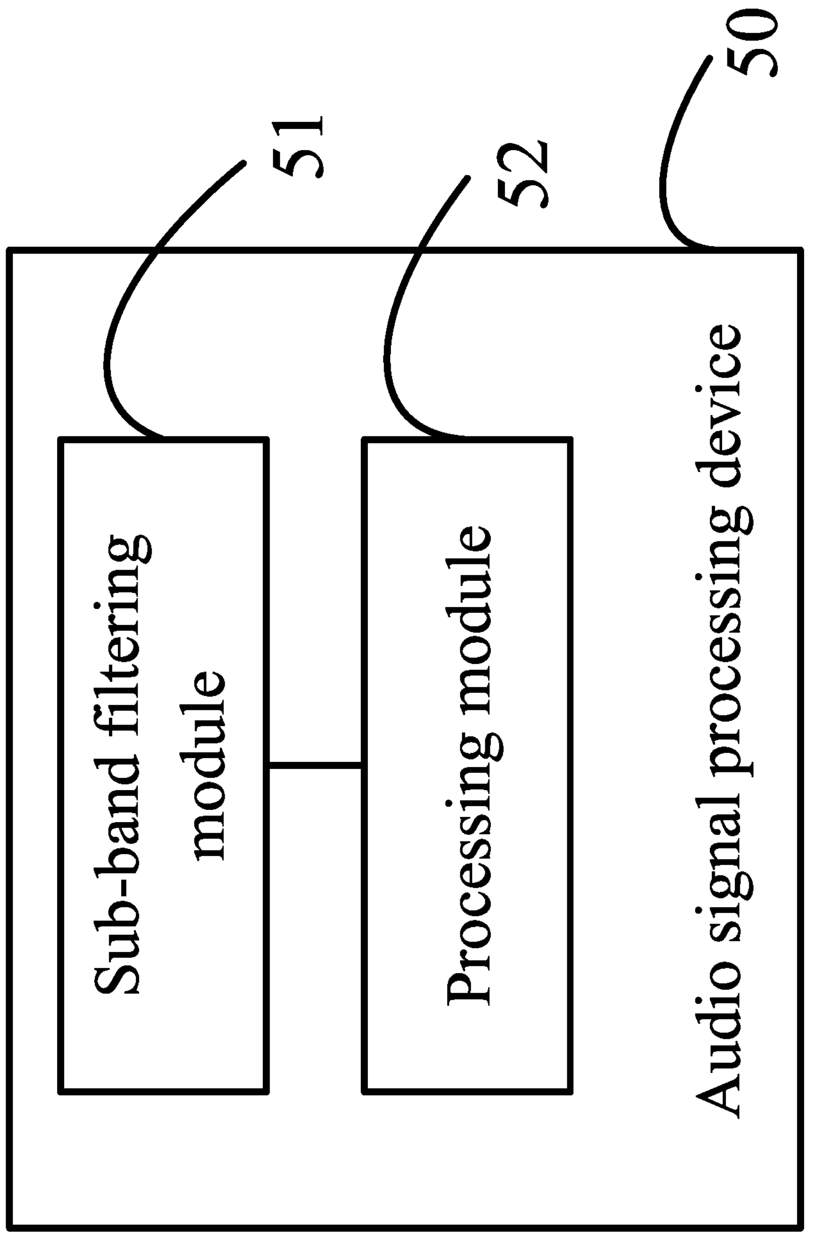
FIG. 5 is a schematic diagram of structures of an audio signal processing device according to an embodiment of the present disclosure.

Referring to FIG. 5, a schematic diagram of structures of an audio signal processing device according to an exemplary embodiment of the present disclosure is shown. The audio signal processing device may be implemented as all or a part of an electronic apparatus such as an interactive white board by software, hardware, or a combination thereof. The audio signal processing device 50 includes a sub-band filtering module 51 and a processing module 52. Wherein the two modules are connected to each other.

The sub-band filtering module 51 is configured to perform sub-band filtering on a to-be-processed audio signal to obtain a plurality of sub-band signals, wherein the number of the sub-band signals is determined according to a lowest frequency of a band-pass filter and a cut-off frequency of an audio apparatus, and the sub-band signals include sub-band band-pass signals;

The processing module 52 is configured to obtain a target audio signal according to each of the sub-band band-pass signals and a processing algorithm of virtual bass enhancement signal.

Figure 6:
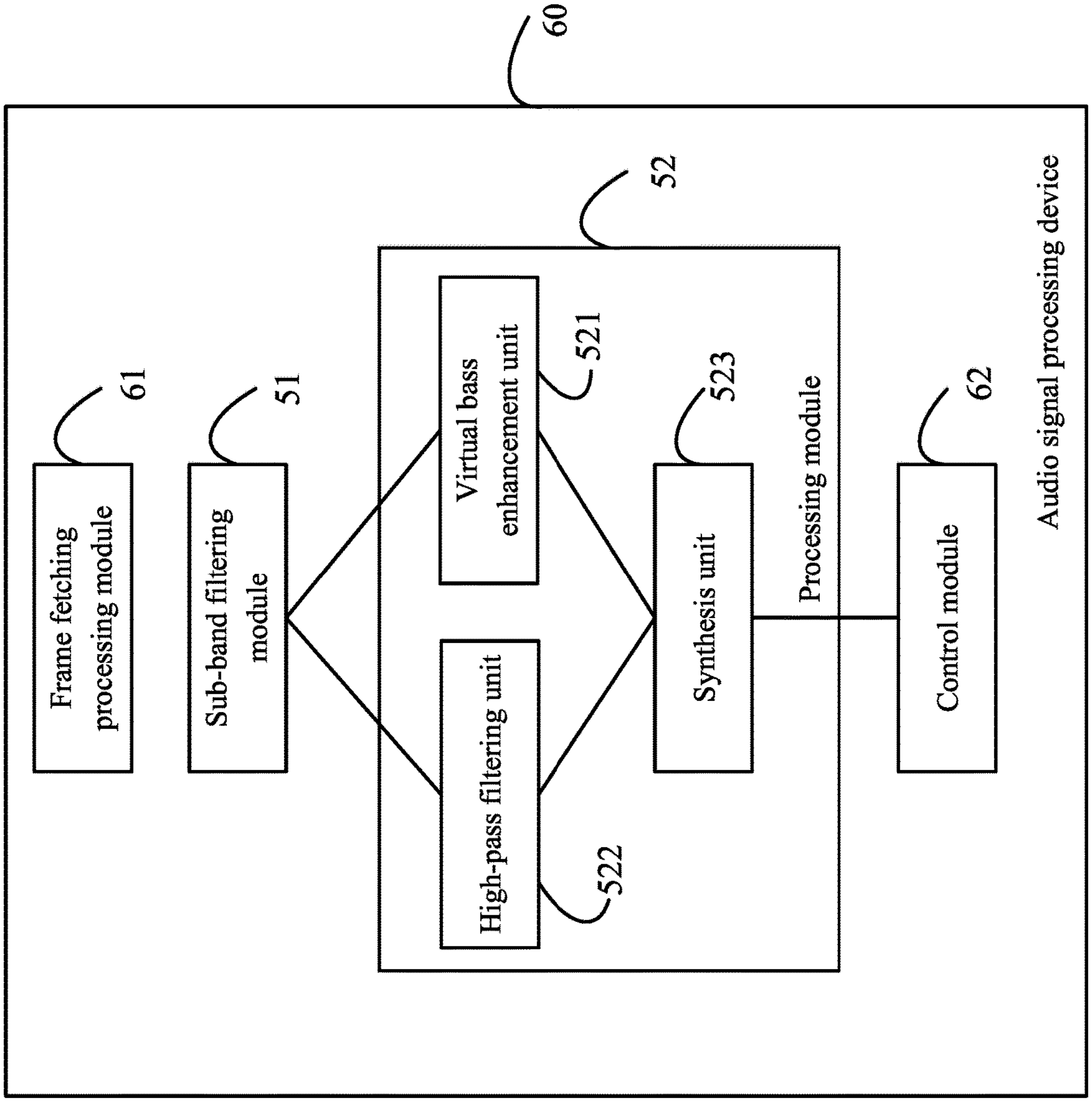
FIG. 6 is a schematic diagram of structures of an audio signal processing device according to another embodiment of the present disclosure.

In some implementations, the processing algorithm of virtual bass enhancement signal includes a non-linear device algorithm. As shown in FIG. 6, in the audio signal processing device 60, the processing module 52 may include: a virtual bass enhancement unit 521, configured to obtain a virtual bass enhancement signal according to each of the sub-band band-pass signals and the non-linear device algorithm; a high-pass filtering unit 522, configured to perform high-pass filtering or delay processing on sub-band high-pass signals in the sub-band signals to obtain a high-frequency audio signal; a synthesis unit 523, configured to obtain the target audio signal according to the virtual bass enhancement signal and the high-frequency audio signal.

In some implementations, the virtual bass enhancement unit 521 is configured to: perform non-linear processing on each of the sub-band band-pass signals based on the non-linear device algorithm to obtain a corresponding non-linear signal; perform summation processing on each non-linear signal; perform band-pass filtering on the summed signal to obtain harmonic components of a low-frequency audio signal; and perform audio synthesis of the harmonic components and harmonic components of a to-be-processed audio signal in a previous frame to obtain the virtual bass enhancement signal.

In some implementations, when performing summation processing on each non-linear signal includes, the virtual bass enhancement unit 521 is configured to: perform summation processing on each non-linear signal based on a weight corresponding to each non-linear signal, wherein the weight is used to adjust the proportion of the corresponding non-linear signal.

In some implementations, the high-pass filtering unit 522 is configured to: perform high-pass filtering or delay processing on the sub-band high-pass signals in the sub-band signals; and overlap and add signals obtained by high-pass filtering or delay processing to obtain the high-frequency audio signal.

In some implementations, the synthesis unit 523 is configured to: acquire a preset bass gain; determine a maximum virtual bass gain of the virtual bass enhancement signal according to the high-frequency audio signal and the virtual bass enhancement signal; determine a target virtual bass gain of the virtual bass enhancement signal according to the preset virtual bass gain and the maximum virtual bass gain; perform gain processing on the virtual bass enhancement signal based on the target virtual bass gain to obtain a bass harmonic signal; and superimpose the bass harmonic signal and the high-frequency audio signal to obtain the target audio signal.

In some embodiments, the audio signal processing device 60 may further include: a frame fetching processing module 61, configured to perform continuous frame fetching processing or overlapping frame fetching processing on an input source audio signal to obtain the to-be-processed audio signal, wherein the frame length of the to-be-processed audio signal is determined according to at least one of a sampling rate, a processing resource, and a system delay.

Further, the audio signal processing device 60 may further include: a control module 62, configured to perform audio dynamic range control on the target audio signal to obtain a to-be-output audio signal.

It should be noted that, although when the audio signal processing device provided by the above embodiment executes the audio signal processing method, only the division of the above functional modules is used as an example for description, in actual application, the above functions may be allocated to different functional modules for completion as required, that is, the internal structure of the apparatus is divided into different functional modules to complete all or a part of the functions described above. In addition, embodiments of the audio signal processing device and embodiments of the audio signal processing method belong to the same concept, and the implementation process thereof is detailed in the method embodiment, and will not be repeated here.

The above serial numbers of the embodiments of the present disclosure are merely for description, and do not represent the advantages or disadvantages of the embodiments.

In the embodiment of the present disclosure, sub-band filtering is performed on a to-be-processed audio signal to obtain a plurality of sub-band signals, wherein the number of the sub-band signals is determined according to a lowest frequency of a band-pass filter and a cut-off frequency of an audio apparatus. And a target audio signal is obtained according to each of the sub-band signals and a processing algorithm of virtual bass enhancement signal. By performing the sub-band filtering on the to-be-processed audio signal, and performing virtual bass enhancement signal processing on each of the sub-band signals using the processing algorithm of virtual bass enhancement signal, intermodulation distortion is restricted by the sub-band signals, thereby reducing perceivable timbre distortion, and improving the playback effect of a virtual bass.

Embodiment 7

An embodiment of the present disclosure further provides a computer storage medium, wherein the computer storage medium may store a plurality of instructions, the instructions are adapted to be loaded by a processor and execute method steps of the above method embodiment. For a specific execution process, reference may be made to the specific description of the method embodiment, and details are not repeated again.

Apparatus on which the storage medium is located may be an electronic apparatus, such as an interactive white board, which has an audio speaker function.

Embodiment 8

An embodiment of the present disclosure provides a computer program product, including a computer program, wherein the computer program is adapted to be loaded by the processor and execute the method steps of the above method embodiment. For a specific execution process, reference may be made to the specific description of the method embodiment, and details are not repeated again.

Embodiment 9

Figure 7:
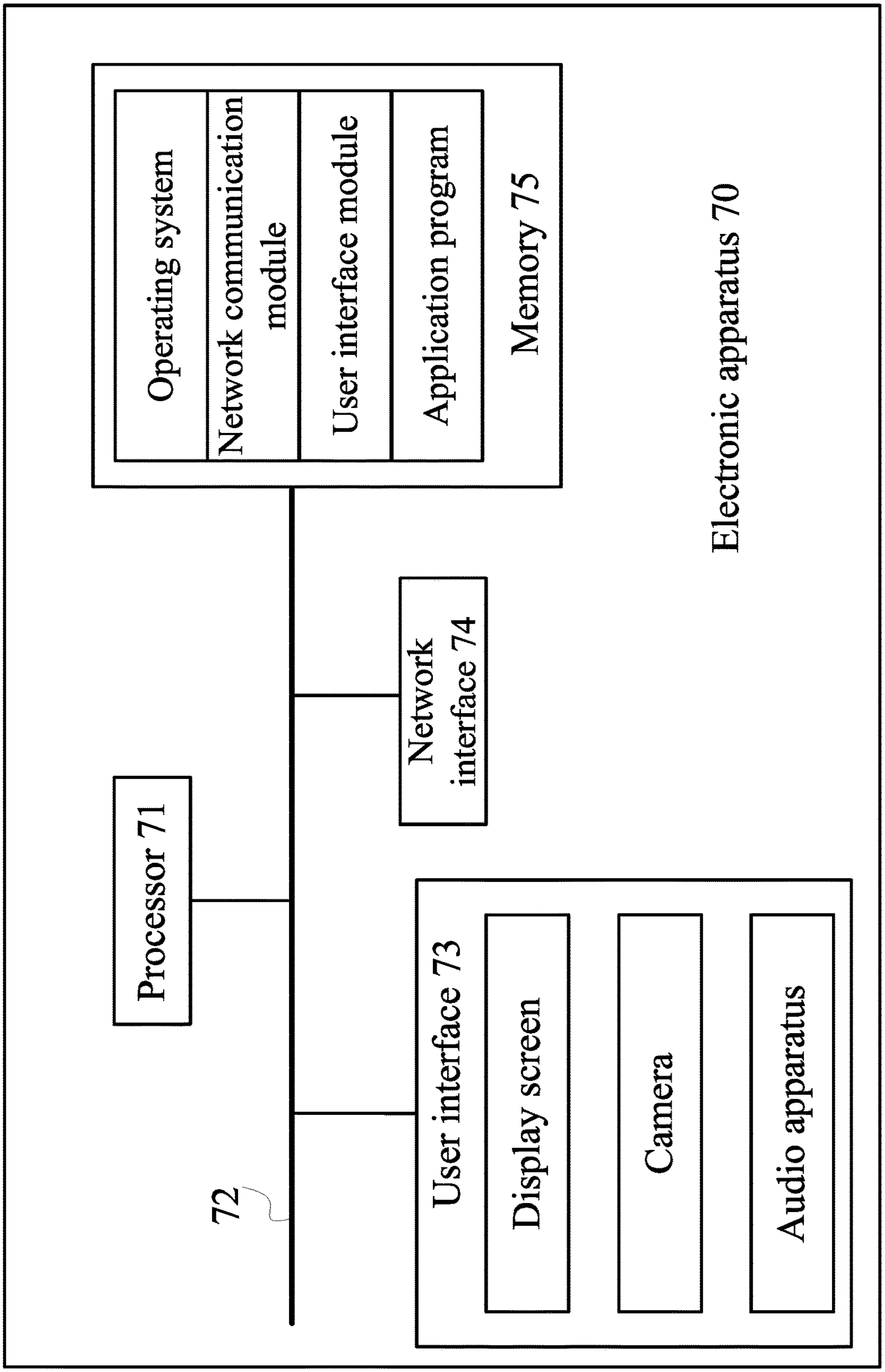
FIG. 7 is a schematic diagram of structures of an electronic apparatus according to an embodiment of the present disclosure.

Referring to FIG. 7, a schematic diagram of structures of an electronic apparatus is provided according to an embodiment of the present disclosure. As shown in FIG. 7, the electronic apparatus 70 may include at least one processor 71, at least one network interface 74, a user interface 73, a memory 75, and at least one communication bus 72, wherein:

The communication bus 72 is configured to implement connection communications between these components.

The user interface 73 may include a display screen, a camera, and an audio apparatus. In some implementations, the user interface 73 may further include a standard wired interface and wireless interface.

The network interface 74 may include a standard wired interface and wireless interface (such as a WI-FI interface).

The processor 71 may include one or more processing cores. The processor 71 connects various parts within the entire electronic apparatus 70 using various interfaces and lines, and executes various functions of the electronic apparatus 70 and processes data by running or executing instructions, programs, code sets, or instruction sets stored in the memory 75 and invoking data stored in the memory 75. In some implementations, the processor 71 may be implemented by using at least one hardware form of Digital Signal Processing (DSP), a Field-Programmable Gate Array (FPGA), and a Programmable Logic Array (PLA). The processor 71 may integrate one or a combination of several of a Central Processing Unit (CPU), a Graphics Processing Unit (GPU), a modem, and the like.

Wherein the CPU mainly processes an operating system, a user interface, an application program, and the like, the GPU is configured to be responsible for rendering and drawing of content to be displayed on the display screen, and the modem is configured to handle wireless communication. It will be appreciated that the above modem may also not be integrated into the processor 71, but may be implemented by using a chip alone.

The memory 75 may include a Random Access Memory (RAM) or may include a Read-Only Memory (ROM). In some implementations, the memory 75 includes a non-transitory computer-readable storage medium. The memory 75 may be used to store instructions, programs, codes, code sets, or instruction sets. The memory 75 may include a program storage area and a data storage area, wherein the program storage area may store instructions for implementing an operating system, instructions for at least one function (such as a touch function, a sound playing function, an image playing function, and the like), instructions for implementing the above various method embodiments, and the like. The data storage area may store data involved in the above various method embodiments, and the like. The memory 75 may also be at least one storage device located away from the aforementioned processor 71. As shown in FIG. 7, the memory 75 serving as a computer storage medium may include an operating system, a network communication module, a user interface module, and an operation application program of the electronic apparatus 70. In some implementations, the operating system of the electronic apparatus 70 is an Android system, but the present disclosure is not limited thereto.

In the electronic apparatus 70 shown in FIG. 7, the user interface 73 is mainly configured to provide an input interface for the user, and acquire data input by the user, and the processor 71 may be configured to invoke the operation application program of the electronic apparatus 70 stored in the memory 75 and execute the following operations: performing sub-band filtering on a to-be-processed audio signal to obtain a plurality of sub-band signals, wherein the number of the sub-band signals is determined according to a lowest frequency of a band-pass filter and a cut-off frequency of an audio apparatus, and the sub-band signals include sub-band band-pass signals; and obtaining a target audio signal according to each of the sub-band band-pass signals and a processing algorithm of virtual bass enhancement signal.

In some embodiments, the processing algorithm of virtual bass enhancement signal includes a non-linear device algorithm. The step of the processor 71 obtaining the target audio signal according to each of the sub-band band-pass signals and the processing algorithm of virtual bass enhancement signal includes: obtaining a virtual bass enhancement signal according to each of the sub-band band-pass signals and the non-linear device algorithm; performing high-pass filtering or delay processing on sub-band high-pass signals in the sub-band signals to obtain a high-frequency audio signal; and obtaining the target audio signal according to the virtual bass enhancement signal and the high-frequency audio signal.

In some embodiments, the step of the processor 71 obtaining the virtual bass enhancement signal according to each of the sub-band band-pass signals and the non-linear device algorithm includes: performing non-linear processing on each of the sub-band band-pass signals based on the non-linear device algorithm to obtain a corresponding non-linear signal; performing summation processing on each non-linear signal; performing band-pass filtering on the summed signal to obtain harmonic components of a low-frequency audio signal; and performing audio synthesis of the harmonic components and harmonic components of a to-be-processed audio signal in a previous frame to obtain the virtual bass enhancement signal.

In some embodiments, the step of the processor 71 performing summation processing on each non-linear signal includes: performing summation processing on each non-linear signal based on a weight corresponding to each non-linear signal, wherein the weight is used to adjust the proportion of the corresponding non-linear signal.

In some embodiments, the step of the processor 71 performing high-pass filtering or delay processing on the sub-band high-pass signals in the sub-band signals to obtain the high-frequency audio signal includes: performing high-pass filtering or delay processing on the sub-band high-pass signals in the sub-band signals; and overlapping and adding signals obtained through high-pass filtering or delay processing to obtain the high-frequency audio signal.

In some embodiments, the step of the processor 71 obtaining the target audio signal according to the virtual bass enhancement signal and the high-frequency audio signal may include: acquiring a preset bass gain; determining a maximum virtual bass gain of the virtual bass enhancement signal according to the high-frequency audio signal and the virtual bass enhancement signal; determining a target virtual bass gain of the virtual bass enhancement signal according to the preset virtual bass gain and the maximum virtual bass gain; performing gain processing on the virtual bass enhancement signal based on the target virtual bass gain to obtain a bass harmonic signal; and superimposing the bass harmonic signal and the high-frequency audio signal to obtain the target audio signal.

In some embodiments, the processor 71 further executes the following steps: before performing sub-band filtering on the to-be-processed audio signal to obtain the plurality of sub-band signals, performing continuous frame fetching processing or overlapping frame fetching processing on an input source audio signal to obtain the to-be-processed audio signal, wherein the frame length of the to-be-processed audio signal is determined according to at least one of a sampling rate, a processing resource, and a system delay.

In some embodiments, the processor 71 further executes the following steps: after obtaining the target audio signal, performing audio dynamic range control on the target audio signal to obtain a to-be-output audio signal.

In the embodiment of the present disclosure, sub-band filtering is performed on a to-be-processed audio signal to obtain a plurality of sub-band signals, wherein the number of the sub-band signals is determined according to a lowest frequency of a band-pass filter and a cut-off frequency of an audio apparatus, and the sub-band signals include sub-band band-pass signals. And a target audio signal is obtained according to each of the sub-band band-pass signals and a processing algorithm of virtual bass enhancement signal. By performing the sub-band filtering on the to-be-processed audio signal, and performing virtual bass enhancement signal processing on each of the sub-band band-pass signals using the processing algorithm of virtual bass enhancement signal, intermodulation distortion is restricted by the sub-band signals, thereby reducing perceivable timbre distortion, and improving the playback effect of a virtual bass.

Those skilled in the art should understand that the embodiment of the present disclosure may be provided as a method, a system, or a computer program product. Accordingly, the present disclosure may take the form of an entirely hardware embodiment, an entirely software embodiment, or an embodiment combining software and hardware aspects. Moreover, the present disclosure may take the form of a computer program product implemented on one or more computer-usable storage media (including, but not limited to, a magnetic disk memory, a CD-ROM, an optical memory, and the like) in which computer-usable program code is stored.

The present disclosure is described with reference to flowcharts and/or block diagrams of methods, apparatus (systems), and computer program products according to embodiments of the present disclosure. It should be appreciated that each flow and/or block in the flowcharts and/or block diagrams and the combination of the flows and/or blocks in the flowcharts and/or block diagrams may be implemented by computer program instructions. These computer program instructions may be provided to a processor of a general purpose computer, a special purpose computer, an embedded processor, or other programmable data processing apparatus to produce a machine such that instructions executed by the processor of the computer or other programmable data processing apparatus produce a device for implementing the functions specified in one or more flows of the flow charts and/or one or more blocks of the block diagrams.

These computer program instructions may also be stored in a computer-readable memory capable of directing a computer or other programmable data processing apparatus to operate in a particular manner, such that instructions stored in the computer-readable memory produce manufactures including an instruction device that implements the functions specified in one or more flows of the flow charts and/or one or more blocks of the block diagrams.

These computer program instructions may also be loaded onto a computer or other programmable data processing apparatus, such that a series of operation steps are executed on the computer or other programmable apparatus to generate computer-implemented processing, thus the instructions executed on the computer or other programmable apparatus provide steps of the functions specified in one or more flows of the flow charts and/or one or more blocks of the block diagrams.

In a typical configuration, a computing apparatus includes one or more processors (CPUs), an input/output interface, a network interface, and a memory.

The memory may include a non-permanent memory, a Random Access Memory, a non-volatile memory and/or other forms in a computer readable medium, such as a Read-Only Memory (ROM) or a flash memory (flash RAM). The memory is an example of a computer readable medium.

A computer readable medium, including permanent and non-permanent, removable and non-removable medium, may implement information storage by any method or technology. Information may be computer-readable instructions, data structures, program modules, or other data. Examples of storage medium for a computer include, but not limited to, a Phase-change Random Access Memory (PRAM), a Static Random Access Memory (SRAM), a dynamic Random Access Memory (DRAM), other types of Random Access Memory (RAM), a Read-Only Memory (ROM), an Electrically Erasable Programmable Read-Only Memory (EEPROM), a flash memory or other memory technologies, a Compact Disc Read-Only Memory (CD-ROM), a Digital Versatile Disc (DVD) or other optical storage, a magnetic cassette tape, a magnetic tape magnetic disk storage or other magnetic storage apparatus, or any other non-transmission medium that may be used to store information accessible by a computing apparatus. As defined herein, a computer readable medium does not include a transitory medium, such as a modulated data signal and carrier wave.

It should also be noted that the terms “comprise,” “include,” or any other variation thereof are intended to cover a non-exclusive inclusion, so that a process, a method, a commodity, or an apparatus that includes a series of elements not only includes those elements, but also includes other elements that are not explicitly listed, or further includes inherent elements of the process, the method, the commodity, or the apparatus. Without further limitation, an element limited by “include a . . . ” does not exclude other elements existing in a process, a method, a commodity, or an apparatus that includes the element.

The above are merely embodiments of the present disclosure, and are not intended to limit the present disclosure. For those skilled in the art, various modifications and variations may be made to the present disclosure. Any modifications, equivalent replacements, improvements, etc. made within the spirit and principle of the present disclosure shall fall within the scope of the claims of the present disclosure.

What is claimed is:

1. An audio signal processing method, comprising:

performing sub-band filtering on a to-be-processed audio signal to obtain a plurality of sub-band signals, and the sub-band signals comprise sub-band band-pass signals; and obtaining a target audio signal according to each of the sub-band band-pass signals and a processing algorithm of virtual bass enhancement signal, wherein obtaining the target audio signal according to each of the sub-band band-pass signals and the processing algorithm of virtual bass enhancement signal comprises:

obtaining a virtual bass enhancement signal according to each of the sub-band band-pass signals and a non-linear device algorithm;

obtaining a high-frequency audio signal according to sub-band high-pass signals in the sub-band signals;

determining a target virtual bass gain of the virtual bass enhancement signal according to a preset virtual bass gain and a maximum virtual bass gain;

performing gain processing on the virtual bass enhancement signal based on the target virtual bass gain to obtain a bass harmonic signal; and superimposing the bass harmonic signal and the high-frequency audio signal to obtain the target audio signal.

2. The audio signal processing method according to claim 1, wherein the number of the sub-band signals is determined according to a lowest frequency of a band-pass filter and a cut-off frequency of an audio apparatus, wherein obtaining the high-frequency audio signal according to the sub-band high-pass signals in the sub-band signals comprises: performing high-pass filtering or delay processing on the sub-band high-pass signals in the sub-band signals to obtain the high-frequency audio signal.

3. The audio signal processing method according to claim 1, wherein obtaining the virtual bass enhancement signal according to each of the sub-band band-pass signals and the non-linear device algorithm comprises:

performing non-linear processing on each of the sub-band band-pass signals based on the non-linear device algorithm to obtain a corresponding non-linear signal of each of the sub-band band-pass signals;

performing summation processing on each non-linear signal to obtain a summed signal;

performing band-pass filtering on the summed signal to obtain harmonic components of a low-frequency audio signal; and performing audio synthesis of the harmonic components and harmonic components of a to-be-processed audio signal in a previous frame to obtain the virtual bass enhancement signal.

4. The audio signal processing method according to claim 3, wherein performing summation processing on each non-linear signal to obtain the summed signal comprises:

performing summation processing on each non-linear signal based on a weight corresponding to each non-linear signal, wherein the weight is used to adjust the proportion of the corresponding non-linear signal.

5. The audio signal processing method according to claim 2, wherein performing high-pass filtering or delay processing on the sub-band high-pass signals in the sub-band signals to obtain the high-frequency audio signal comprises:

performing high-pass filtering or delay processing on the sub-band high-pass signals in the sub-band signals; and overlapping and adding signals obtained through the high-pass filtering or delay processing to obtain the high-frequency audio signal.

6. The audio signal processing method according to claim 1, wherein the maximum virtual bass gain of the virtual bass enhancement signal is determined according to the high-frequency audio signal and the virtual bass enhancement signal.

7. The audio signal processing method according to claim 1, wherein before performing sub-band filtering on the to-be-processed audio signal to obtain the plurality of sub-band signals, the method further comprises:

performing continuous frame fetching processing or overlapping frame fetching processing on an input source audio signal to obtain the to-be-processed audio signal, wherein a frame length of the to-be-processed audio signal is determined according to at least one of a sampling rate, a processing resource, or a system delay.

8. The audio signal processing method according to claim 1, wherein after obtaining the target audio signal according to each of the sub-band band-pass signals and the processing algorithm of virtual bass enhancement signal, the method further comprises:

performing audio dynamic range control on the target audio signal to obtain a to-be-output audio signal.

9. An electronic apparatus, comprising:

a memory storing computer-readable instructions; and a processor coupled to the memory and configured to execute the computer-readable instructions, wherein the computer-readable instructions, when executed by the processor, cause the processor to perform operations comprising:

performing sub-band filtering on a to-be-processed audio signal to obtain a plurality of sub-band signals, and the sub-band signals comprise sub-band band-pass signals; and obtaining a target audio signal according to each of the sub-band band-pass signals and a processing algorithm of virtual bass enhancement signal, wherein obtaining the target audio signal according to each of the sub-band band-pass signals and the processing algorithm of virtual bass enhancement signal comprises:

obtaining a virtual bass enhancement signal according to each of the sub-band band-pass signals and a non-linear device algorithm;

obtaining a high-frequency audio signal according to sub-band high-pass signals in the sub-band signals;

determining a target virtual bass gain of the virtual bass enhancement signal according to a preset virtual bass gain and a maximum virtual bass gain;

performing gain processing on the virtual bass enhancement signal based on the target virtual bass gain to obtain a bass harmonic signal; and superimposing the bass harmonic signal and the high-frequency audio signal to obtain the target audio signal.

10. The electronic apparatus according to claim 9, wherein the number of the sub-band signals is determined according to a lowest frequency of a band-pass filter and a cut-off frequency of an audio apparatus, wherein obtaining the high-frequency audio signal according to the sub-band high-pass signals in the sub-band signals comprises:

performing high-pass filtering or delay processing on the sub-band high-pass signals in the sub-band signals to obtain the high-frequency audio signal.

11. The electronic apparatus according to claim 9, wherein obtaining the virtual bass enhancement signal according to each of the sub-band band-pass signals and the non-linear device algorithm comprises:

performing non-linear processing on each of the sub-band band-pass signals based on the non-linear device algorithm to obtain a corresponding non-linear signal of each of the sub-band band-pass signals;

performing summation processing on each non-linear signal to obtain a summed signal;

performing band-pass filtering on the summed signal to obtain harmonic components of a low-frequency audio signal; and performing audio synthesis of the harmonic components and harmonic components of a to-be-processed audio signal in a previous frame to obtain the virtual bass enhancement signal.

12. The electronic apparatus according to claim 11, wherein performing summation processing on each non-linear signal to obtain the summed signal comprises:

performing summation processing on each non-linear signal based on a weight corresponding to each non-linear signal, wherein the weight is used to adjust the proportion of the corresponding non-linear signal.

13. The electronic apparatus according to claim 10, wherein performing high-pass filtering or delay processing on the sub-band high-pass signals in the sub-band signals to obtain the high-frequency audio signal comprises:

performing high-pass filtering or delay processing on the sub-band high-pass signals in the sub-band signals; and overlapping and adding signals obtained through the high-pass filtering or delay processing to obtain the high-frequency audio signal.

14. The electronic apparatus according to claim 9, wherein the maximum virtual bass gain of the virtual bass enhancement signal is determined according to the high-frequency audio signal and the virtual bass enhancement signal.

15. The electronic apparatus according to claim 9, wherein before performing sub-band filtering on the to-be-processed audio signal to obtain the plurality of sub-band signals, the method further comprises:

performing continuous frame fetching processing or overlapping frame fetching processing on an input source audio signal to obtain the to-be-processed audio signal, wherein a frame length of the to-be-processed audio signal is determined according to at least one of a sampling rate, a processing resource, or a system delay.

16. The electronic apparatus according to claim 9, wherein after obtaining the target audio signal according to each of the sub-band band-pass signals and the processing algorithm of virtual bass enhancement signal, the method further comprises:

performing audio dynamic range control on the target audio signal to obtain a to-be-output audio signal.

17. A non-transitory computer-readable medium storing computer-readable instructions that, when executed by a processor, cause the processor to perform operations comprising:

performing sub-band filtering on a to-be-processed audio signal to obtain a plurality of sub-band signals, and the sub-band signals comprise sub-band band-pass signals; and obtaining a target audio signal according to each of the sub-band band-pass signals and a processing algorithm of virtual bass enhancement signal, wherein obtaining the target audio signal according to each of the sub-band band-pass signals and the processing algorithm of virtual bass enhancement signal comprises:

obtaining a virtual bass enhancement signal according to each of the sub-band band-pass signals and a non-linear device algorithm;

obtaining a high-frequency audio signal according to sub-band high-pass signals in the sub-band signals;

determining a target virtual bass gain of the virtual bass enhancement signal according to a preset virtual bass gain and a maximum virtual bass gain;

performing gain processing on the virtual bass enhancement signal based on the target virtual bass gain to obtain a bass harmonic signal; and superimposing the bass harmonic signal and the high-frequency audio signal to obtain the target audio signal.

18. The non-transitory computer-readable medium according to claim 17, wherein the number of the sub-band signals is determined according to a lowest frequency of a band-pass filter and a cut-off frequency of an audio apparatus, wherein obtaining the high-frequency audio signal according to the sub-band high-pass signals in the sub-band signals comprises: performing high-pass filtering or delay processing on the sub-band high-pass signals in the sub-band signals to obtain the high-frequency audio signal.

19. The non-transitory computer-readable medium according to claim 17, wherein obtaining the virtual bass enhancement signal according to each of the sub-band band-pass signals and the non-linear device algorithm comprises:

performing non-linear processing on each of the sub-band band-pass signals based on the non-linear device algorithm to obtain a corresponding non-linear signal of each of the sub-band band-pass signals;

performing summation processing on each non-linear signal to obtain a summed signal;

performing band-pass filtering on the summed signal to obtain harmonic components of a low-frequency audio signal; and performing audio synthesis of the harmonic components and harmonic components of a to-be-processed audio signal in a previous frame to obtain the virtual bass enhancement signal.

20. The non-transitory computer-readable medium according to claim 19, wherein performing summation processing on each non-linear signal to obtain the summed signal comprises:

performing summation processing on each non-linear signal based on a weight corresponding to each non-linear signal, wherein the weight is used to adjust the proportion of the corresponding non-linear signal.

* * * * *